R. C. BIERBOWER.
ELECTRICAL TESTING DEVICE.
APPLICATION FILED AUG. 20, 1917.
1,335,646.
Patented Mar. 30, 1920.
2 SHEETS—SHEET 2.
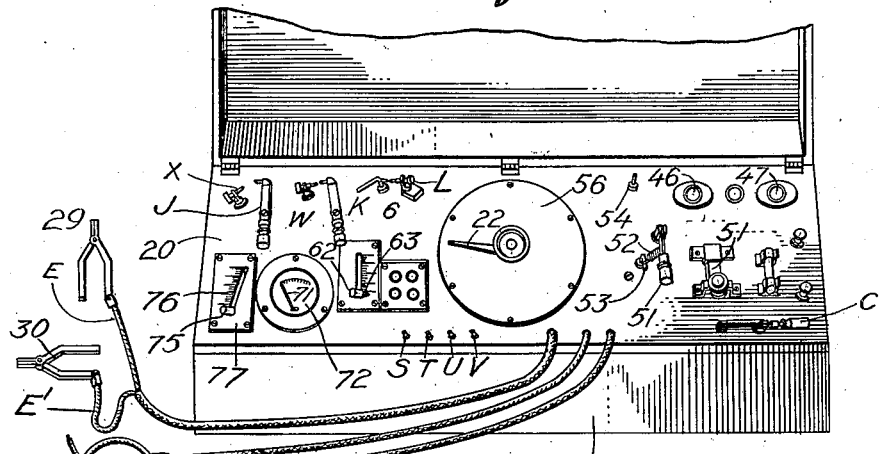
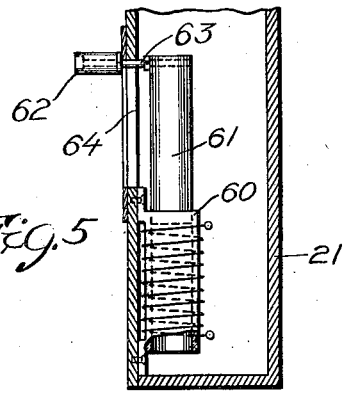
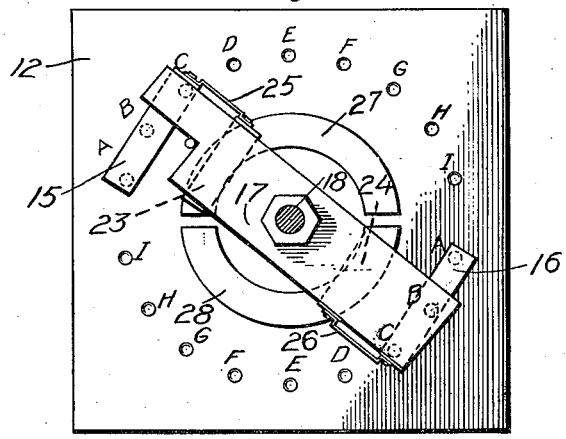
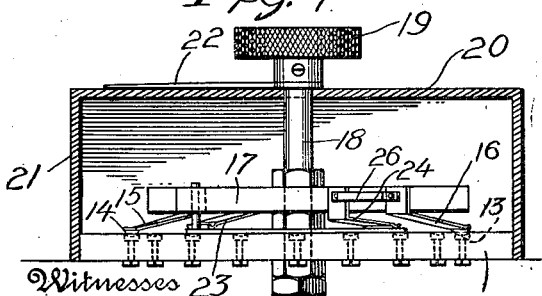
Inventor
Richard C. Bierbower.
by Wilkinson & Ginsta
Attorneys.
Witnesses
Edwin J. Beller.
R. J. Mawhinney.

UNITED STATES PATENT OFFICE.

RICHARD C. BIERBOWER, OF SAN ANTONIO, TEXAS, ASSIGNOR, BY DIRECT AND MESNE ASSIGNMENTS, TO TESTALL ELECTRIC MANUFACTURING CO., OF SAN ANTONIO, TEXAS, A CORPORATION OF TEXAS.

ELECTRICAL TESTING DEVICE.

1,335,646.　　　　Specification of Letters Patent.　　Patented Mar. 30, 1920.

Application filed August 20, 1917. Serial No. 187,236.

*To all whom it may concern:*

Be it known that I, RICHARD C. BIERBOWER, a citizen of the United States, residing at San Antonio, in the county of Bexar and State of Texas, have invented certain new and useful Improvements in Electrical Testing Devices; and I do hereby declare the following to be a full, clear, and exact description of the invention, such as will enable others skilled in the art to which it appertains to make and use the same.

The present invention relates to improvements in electrical testing devices, and has for its principal object to provide a new and improved circuit arrangement in combination with various devices all assembled in compact arrangement on a board, by which I am enabled to easily and quickly locate faults in various electrical apparatus or parts thereof, and which is of such character as to be capable of use by one who is not a skilled electrician.

In the accompanying drawings forming a part of this application, and in which similar reference symbols indicate corresponding parts in the several views:

Fig. 2 is a perspective view of the test board for holding the various devices shown in combination with a box, the lid of which is partly broken away.

Fig. 3 is a plan view of an improved form of switch employed in conjunction with my invention.

Fig. 4 is a cross sectional view through the testing box, showing the switch in elevation.

Fig. 5 is a cross sectional view through the switch box, illustrating the choke coil.

Figure 1:
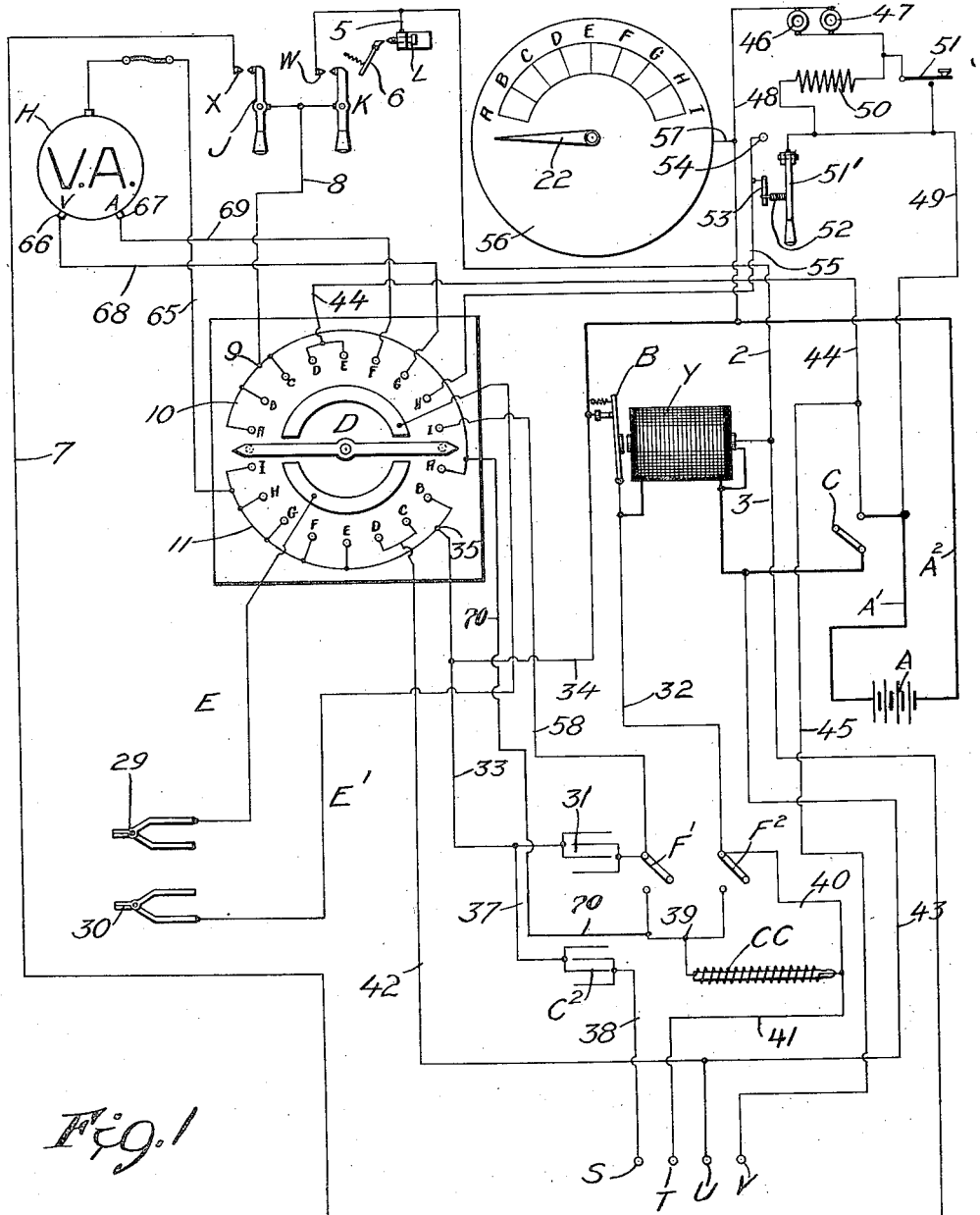
Figure 1 illustrates a diagrammatic view of the circuit arrangement for my improved testing device.

Referring more particularly to the drawings, A is a source of current for a main circuit $A^1$, $A^2$, which is under the control of a switch C and includes the primary winding of an induction coil Y, as also the armature B thereof.

When the switch C is closed, current travels from the source A through the circuit $A^1$ and $A^2$ passing through the primary of the induction coil Y, such circuit being continuously made and broken by the vibrator B, which induces in well known manner an alternating current in the secondary of the induction coil Y, which secondary is included in a circuit 2, 3. The lead 3 of this secondary circuit is provided with a terminal 4, which is adapted to be grounded or be applied to one side of an electrical instrument to be tested. Another lead 2 of the same side of the secondary circuit is in connection with one contact W of a spark gap, the other contact of which is carried on a lever K adapted to be moved to vary the distance across the contacts, and consequently to either enlarge or diminish the gap which the spark must jump.

A lead 5 is connected between the lead 2 and an adjustable screw L, which forms part of a second spark gap completed by a contact on a pivoted spring-controlled arm 6.

There is also an adjacent spark gap formed by contact X and a second contact carried by a lever J, similar to the lever K, as clearly shown in Figs. 1 and 2. This contact X is joined by a lead 7 with a clip Z, whereby it may be attached to parts of instruments in a manner to be hereinafter more fully described.

The two levers J and K of the adjustable spark gaps are in electrical connection through a wire 8, which is joined, as at 9, to a bus wire 10 of a switch D. This switch D has another bus wire 11 extending about the side opposite to the bus wire 10 and two series of contact studs lettered from A to I in Fig. 1, certain of these contact studs being connected by short leads to the bus wires 10 and 11.

As illustrated more particularly in Figs. 3 and 4, these contact studs are inserted through a base plate 12 of fiber or other insulating material, and have their tops concaved, as indicated at 13, to coöperate with the convex free ends 14 of contact springs 15 and 16, adapted to pass over the upper face of the base plate 12 and come into successive engagement with the two series of contact studs embedded therein; such contact springs 15 and 16 being carried at opposite ends of a block 17 mounted to rotate about an arbor 18, the necessary motion being accomplished through a knurled head 19 extending above the base board 20 which forms part of the box 21 as shown in Figs. 2 and 4.

This knurled head 19 also carries an index 22 which appears in Figs. 1, 2 and 4, the same being arranged to move over a scale, illustrated in Fig. 1 bearing the letters from A to I, in positions corresponding to the positions of the studs in the selective switch and apprising the user of the device as to the position of the contact springs 15 and 16 within the box.

The block 17 also carries other contact springs 23 and 24, electrically joined to the contact springs 15 and 16 by pieces 25 and 26. These contact springs 23 and 24 move over semi-circular contact strips 27 and 28, which, as shown in Fig. 1, are connected by leads E and E¹ with appliances 29 and 30 for making contact with the binding posts, or other terminals of electrical instruments to be tested.

A condenser 31 is in connection with the vibrator B through the switches F¹ and F² and the wire 32; while the opposite side of this condenser 31 is in connection through wires 33 and 34 with the contact screw of said vibrator B. A wire 58 passes from the switch F¹ to the stud I on the upper part of the switch D. The lead 33 is connected, as shown at 35, to the bus wire 11 of the switch D.

A second condenser C² is connected to the lead 33 by a wire 37, it having its opposite side joined by the lead 38 with the post S.

One terminal of each of the switches F¹ and F² are connected together, as indicated at 39, and are in connection with a choke coil C, C. The opposite side of this coil is joined by a wire 40 to the other terminal of the switch F² and by a second wire 41 to the post T.

This choke coil is made up of a few turns of coarse insulated wire wound on a short length of fiber tubing 60, fastened in any suitable manner within the box 21. A short iron core 61 is adapted to slide within the tubing 60, and is inserted and withdrawn therefrom by a knob 62 carried on a bolt 63 projecting through a slot 64 in the base board 20, as shown in Figs. 2 and 5. The knob 62 carries a pointer 63, which may move over a suitable scale to indicate the position of the core 61 and to represent the amount of the choking effect.

A post U, adjacent the post T on the base board 20, is coupled by a wire 42 with two of the studs C and D on the lower part of the switch and by a wire 43, with one side A¹ of the main circuit. Two of the studs D and E on the upper part of the switch are coupled by a wire 44 with the side A¹ of the main circuit, and this wire 44 is joined by another wire 45 running to a post V next the post U.

At 46 and 47 are shown sockets for receiving lamps to be tested, which sockets are arranged in parallel in a circuit 48, 49, coupled to the main circuit A, A². A suitable resistance 50 and a key 51 are in multiple across the side 49 of this circuit. The wire 49 also forms a part of a circuit in which is arranged a lever 51' having a spring 52 for making and breaking contact with a strip 53. This strip 53 and a post 54 are connected by a wire 55 with the stud H on the upper part of the switch D.

A cover plate 56 of the switch D, as shown in Fig. 1, is in electrical connection through lead 57 with the wire 48.

H indicates a combined voltammeter and fluxmeter, the same being joined to the lower bus wire 11 of the switch D by wire 65, and having separate lower connections 66 and 67 for independently testing voltage and amperage, the circuit being completed therefrom by leads 68 and 69 connected, respectively, to the studs G and F on the upper part of the switch D.

When the switch C is closed the battery A excites the primary winding of the vibrator coil Y, thereby inducing a high tension current in the secondary winding which is connected by the wire 2 to the spark gap W, K. Condenser 31 is connected across the vibrator B by the leads 33, 34 and 32, and with the condenser thus connected there should be a good high tension spark between the contacts W and K, the gap between which may be varied by moving the lever K.

*Condenser tests.*—The block 17 of the switch D is turned so that the contact springs 15 and 16 rest on the studs B. The switch F¹ is opened and the switch F² is closed. A condenser is attached to the appliances 29 and 30. It will therefore be seen that as the switch F¹ is opened, the condenser 31 will be no longer connected across the vibrator B, but that the condenser which is connected to the appliances 29 and 30 will be inserted with this vibrator B through the leads 34, 35, 32, switch F² and leads 39 and 70. If the condenser is in good condition the high tension spark will occur at gap W, K, but if the condenser is weak or entirely lacking in capacity there will be an intermittent spark or none at all. If the condenser is short-circuited it will throw a short circuit across the vibrator, which will be evidenced by the vibrator B making a single click, the vibrator spring clinging to the iron core of the coil Y.

Since a condenser of large capacity and one of much smaller capacity, when substituted in the manner above indicated for the condenser 31, might both have sufficient capacity to cause high tension sparks to jump across gap W, K, it follows that the above method of testing would only serve to determine as to whether the condenser was short-circuited or greatly lacking in capacity. If only slightly lacking in capacity this test would fail to show the fact. For this purpose the choke coil C, C, may be connected in the condenser circuit by means of the switch F². When the switch F² is opened the condenser circuit also includes the choke coil C, C, which, for testing condensers of small capacity, is adjusted with the core 61 completely withdrawn from the tube 60.

In order to determine whether a given type of condenser is of standard capacity, the knob or pointer 62, 63, is set at the proper position corresponding to the standard strength of that particular type of condenser, and if the condenser is of the proper capacity it should yield a good spark at the gap W, K; however, if it is necessary to withdraw the core 61 partly or wholly, the condenser is not up to standard, but is lacking in capacity substantially in proportion to the amount of withdrawal of said core 61.

*High tension insulation tests.*—The switch D is turned so that the spring contacts 15 and 16 rest on the studs A. This places both of the test leads E and E¹ in connection with the common terminal side of the secondary winding of the coil Y. Either one of the appliances 29 or 30 is then applied to the center terminal or brush of the distributer head or plate to be tested, and the various terminals or brushes are touched by the terminal 4 carried on the wire 3 forming the other side of the secondary circuit. Observe whether high tension current jumps from one segment to another. The insulation of such devices as slip ring brush holders may be tested by connecting one of the appliances 29 or 30 to the metal terminal thereof, and passing the terminal 4 around over the insulation to locate any possible leak. In making all these heavy insulation tests the lever K is moved to give a spark gap of maximum size. This high tension spark will continue at the gap W, K, unless the insulation being tested is faulty, allowing a shorter path for the high tension current than that across the gap W, K.

The object of the short gap L is to enable me to make insulation tests with high tension current, where the insulation being tested is so thin, that without this safety gap L in multiple with test terminals 4, and 29 and 30 the high tension current would jump through or around the insulation being tested. When this short gap L is to be employed the lever K is thrown against and sprung under and in contact with the arm 6. This leaves a wide gap between W and K, and a very short gap between the arm 6 and the adjustable screw L. This gap is normally adjusted to 2 or 3 thousandths of an inch, but may be widened or shortened by said adjusting screw to increase or diminish the intensity or breaking down effect of the high tension current, when test terminals 4 and 29 and 30 are connected with the article to be tested.

The insulation of the grounding terminal of magneto interrupter end caps, and the insulation of the metal block which carries the platinum contact screw of magneto interrupters is often defective, and this defect may not be detected by means of the low voltage current usually employed for making these tests.

When a magneto is operated at high speed, the static discharge across the interrupter is several hundred volts; consequently in order to detect faulty insulation of the various parts of the interrupter and other insulated parts connected thereto, these parts should be subjected to a current of higher voltage than the current generated within the magneto.

By setting the switch D so that the spring contacts 15 and 16 rest on the studs A, both of the test leads E and E' are connected to the common terminal of the secondary winding of the coil Y. Either one of the appliances 29 and 30 is connected to the ground or common side of the interrupter or end cap, and the terminal 4 carried on the end of wire 3 is applied to the insulated block or screw, and if the insulation between the two parts is defective the small spark at the short gap between the screw L and the arms 6 will disappear, the high tension current having a shorter path through the defective insulation.

Since the insulation usually employed in the construction of interrupters and similar devices, is very thin, I would not be able to test such devices with high tension current except by employing this short gap L connected in multiple with the device being tested. Without this safety gap L connected in multiple with the device being tested the high tension current would jump through or around the thin insulation, but since electricity moves along the line of least resistance, it will in the case of perfect insulation always take the shorter path at gap L. By means of the adjusting screw this gap may be widened for making tests where the insulation is of more than ordinary thickness.

*Testing stationary winding.*—These stationary windings are low tension windings of inductor type magnetos, in which the winding is stationary and the current is generated by iron pole pieces or inductors revolving between the permanent magnets so as to change the magnetic lines of force through said coils.

These windings being of comparatively coarse wire, are of low resistance and the winding is included in the primary circuit of the coil Y, and if there is a break in said winding no current will flow through the primary coil Y, and the vibrator B will not be actuated.

The switch D is first moved to spring the contact springs 15 and 16 in position over the studs D, D; and the switch C may be opened. The winding to be tested is connected to the appliances 29 and 30, whereupon they will be connected in circuit with the battery A by the wires 42, 43 and 44. The buzzing of the vibrator B and the condition of the spark at the gap W, K, will serve to show the condition of the winding. Fuses and other electrical instruments may be tested in the same way by connecting them with the appliances 29 and 30, their condition being made apparent by observing the vibrator and spark gap. With the switch on the contact studs E, E, the test clips 29 and 30 are placed directly in circuit with the battery A and the coil Y and vibrator B are cut out of this circuit. The clips 29 and 30 may be applied to the two terminals of an automobile signal horn, or other appliance, and the condition of the horn or appliance be determined by the current from the battery A.

*Auxiliary condenser.*—By setting the switch in contact with the studs I, I, the terminals of the condenser 31 are connected through the wires 33 and 58 with the test clips 29 and 30. The switch $F^1$ is opened when employing the condenser 31 in this capacity to avoid other contacts on the testing device. The test clips 29 and 30 are applied, for instance, to a circuit breaker or interrupter, and if the latter behaves normally it indicates that the trouble lies in the condenser which is included in the circuit breaker or interrupter circuit. In other words, by applying my testing device in the manner indicated, the auxiliary condenser 31 is substituted for the circuit breaker or interrupter condenser.

*Testing low tension magneto armatures.*— The armature to be tested is placed with one terminal in contact with the metal dial 56 of the switch D, and with the other terminal in contact with the post 54. The lever 51 is thereupon rocked to cause the spring 52 to make and break contact with the post 53. If the armature winding is in good condition there will be a strong spark between the spring and post. If, however, no spark occurs the winding is open; and if but a weak spark winding is short-circuited. The circuit in this case is through the battery A, the wires $A^1$, 49, the lever 51, post 53, wire 55, post 54, armature, dial 56, lead 57, and wires 48 and $A^2$ back to the battery.

*Testing spark plugs.*—The spark plug is placed with one terminal in contact with the metal dial 56, and with the other terminal in contact with the screw L. The lever K is moved to widen the gap W so that the current will rather jump the terminals of the spark plug than said gap. The secondary circuit is as follows: Beginning in the secondary winding of coil Y, the current flows through wire 2 to screw L, to the terminal of spark plug, through plug and plug gap to the plate 56, thence through wires 57, 48, $A^2$ to and through battery A to wire $A'$, switch C, and to common terminal of secondary. This circuit is independent of the vibrator B.

*Testing generator and motor armatures.*— The selective switch D is placed with the contact springs 15 and 16 on the studs D, D, and the armature is connected between the test leads E, $E^1$. With the switch C open the circuit will be completed through the wires 42 and 44, causing the vibrator B to be actuated and to indicate any trouble in the winding. The terminals of the armature may also be connected to the posts U and V, in which case the circuit will also be through the vibrator B by means of the wires 43 and 45. In this case it is unnecessary to set the selective switch in any particular position.

A telephone receiver may be placed across adjacent bars of the commutator, and if the coil is open a loud humming sound may result in the receiver; while short circuits will manifest themselves by diminished humming sound. Should the sound in the receiver be too loud the armature may be disconnected from the posts U and V and connected to the posts S and T, the main switch C being thrown in. The circuit is then through the condenser $C^2$ connecting to the two sides of the vibrator B by the wires 32 and 37, 33 and 34. For armatures which could not be successfully tested in either of these two ways another arrangement is rendered possible by connecting one side to the post T, while the other side is attached either to the post U or the post V, the switch C being closed. The condenser will then be cut out. This last arrangement is for use where armatures of fine winding having many turns and high resistance are to be tested. In this case the armature is in parallel with the primary of the induction coil Y. With these various methods it is possible to test all types of armatures.

*Testing for ground.*—With the switch D making contact with the studs B and one of the test leads E connected to an armature shaft or core, the main circuit is closed by means of the switch C so that the vibrator B is set in motion. The appliance on the end of the other test lead $E^1$ is then touched to the segments of the commutator, and if such commutator is grounded the buzzing of the vibrator will cease, due to the short circuit or ground, which places the test leads E and $E^1$ in a short circuit across the vibrator B. The voltage between the test leads E or $E^1$ may be increased or diminished by widening or shortening the gap W, K.

*Testing low tension coils.*—Generator and motor field coils, make and break coils, and primary winding, in which the resistance is not too great, may be tested by placing the selective switch on the contact studs H, H, and connecting the test leads E and E¹ to the terminals of the coil and thereupon rocking the lever 51. The good condition of the coil will be evidenced by the presence of a strong spark at the coil spring 52.

*Testing high tension armatures.*—For this test the selective switch is placed on the contact studs C, C, and the test leads E and E¹ are connected to the armature in such a way that the primary winding is in parallel with the primary winding of the vibrating coil Y, with the result that the vibrator B serves to interrupt the flow of the battery current in the primary of both coils, the spring wire yoke Z on the end of the high tension wire 7 is sprung over the slip ring of the armature, thus placing the spark gap X, J, in circuit with the secondary of the coil being tested, the length of the spark being the means of showing the condition of the armature. To aid in determining the condition of the condenser which is usually carried with the armature, the condenser 31 may be cut out altogether by opening switch F¹, or it may be cut in through the choke coil C, C and its capacity so reduced that there will be a very poor spark at X, J, unless the condenser in the armature is of standard capacity.

The amperage of dry cells may be readily ascertained by placing the selective switch on the contact studs F, F, and the cells connected to the test leads E, E¹. The circuit will therefore be through the wire 65, meter H, and wire 69 to the studs F. Similarly, the voltage of the cells is ascertained by placing the switch D on the contact studs G, G, thus causing the circuit to go through the wires 65 and 68, and including the voltmeter.

*Testing lamps.*—The lamps to be tested are placed in the sockets 46 and 47, and the circuit will be through the wires 48 and 49 and the resistance 50, so that lamps of a very low voltage may be safely tested. When testing the lamps of a higher voltage, the push button 51 may be closed to cut out the resistance 50.

Of course the above are simply illustrations of the numerous tests which can be made with my improved device.

It is obvious that those skilled in the art may vary the details of construction and arrangements of parts without departing from the spirit of my invention, and therefore I do not wish to be limited to such features except as may be required by the claims.

I claim—

1. A device of the character described including a main circuit, an induction coil in said circuit, a spark gap in circuit with the secondary winding of said coil, a vibrator for said coil, a condenser, means for placing said condenser across said vibrator, a choke coil adapted to be placed in circuit with said condenser, and means to place an instrument to be tested across said vibrator, substantially as described.

2. A device of the character described including a main circuit, an induction coil in said circuit, a spark gap in circuit with the secondary winding of said coil, means for adjusting said spark gap, a vibrator for said coil, a condenser, means adapted to place said condenser across said vibrator, a choke coil, means for placing said choke coil in circuit with said condenser, and means to place an instrument to be tested across said vibrator, substantially as described.

3. A testing device including a main circuit, an induction coil included in said main circuit, a spark gap in circuit with the secondary of said coil, a second spark gap, high tension and test leads connected in circuit with said second mentioned spark gap for coupling same to a device to be tested, and switch means for controlling the circuit through said spark gaps, substantially as described.

4. A device of the character described including a primary circuit, an induction coil having its primary winding included in said circuit, a vibrator for said coil also included in said primary circuit, test leads arranged to connect the primary of a coil to be tested in multiple with the primary coil of said induction coil, and a spark gap arranged to be connected in the secondary of the coil to be tested, substantially as described.

5. A device of the character described including a primary circuit, a coil arranged in said circuit, a switch in said primary circuit, terminals to which an instrument may be attached connected to the poles of said switch whereby the instrument to be tested may be placed directly in said primary circuit when the switch is open, a vibrator for said coil, terminals adapted to connect an instrument to be tested across said vibrator, and a condenser between one of the terminals and said vibrator, substantially as described.

6. An electrical testing apparatus including a primary circuit, an induction coil in said circuit, a vibrator also in said circuit, a high tension circuit including the secondary of said coil, a spark gap in said high tension circuit, means whereby an instrument to be tested may be connected in parallel with said vibrator, a choke coil adapted to be included in series with said vibrator and the instrument to be tested, said choke coil having an adjustable core whereby to adapt the apparatus for testing condensers of varying capacities, and a pointer and scale showing the different positions of said adjustable core and indicating the degree in which the condenser to be tested is lacking in capacity, substantially as described.

7. An electrical testing apparatus including test leads whereby an instrument to be tested may be connected to the apparatus, a vibrator in circuit with said test leads and the instrument to which the latter are connected, a variable inductive resistance, switch means whereby said variable resistance may be placed in circuit with said vibrator and test leads, an induction coil adapted to actuate said vibrator, means for exciting said coil, and a spark gap connected to the high tension winding of said coil, substantially as described.

8. An electrical testing apparatus including a high tension coil, wide and short spark gaps arranged in parallel with respect to each other and each adapted to be placed in circuit with said coil, means whereby either one of said spark gaps is placed in circuit with said coil, a high tension circuit passing through said coil and in multiple with said spark gap, and means whereby the high tension circuit may be applied to an instrument to be tested, substantially as described.

9. In an electrical testing apparatus, the combination of an induction coil, means for energizing the primary of said induction coil, a spark gap arranged in circuit with the secondary of said coil, testing terminals whereby an instrument to be tested may be connected in circuit with the secondary and spark gap, a vibrator for said coil, a condenser, means whereby the condenser may be thrown across said vibrator, other test terminals whereby an instrument to be tested may be connected in parallel with said vibrator, a central switch whereby said last mentioned test terminals may be placed in circuit with the vibrator, and means also controllable through said central switch whereby the instrument connected to said last mentioned test terminals may be placed directly in circuit with the means employed to energize the primary winding of said induction coil, substantially as described.

10. In a testing apparatus of the character described, the combination of an induction coil, a source of current in circuit with the primary of said induction coil, a vibrator for said induction coil, a plurality of spark gaps adapted to be placed in circuit with the secondary of said induction coil, test terminals whereby an instrument to be tested may be connected in circuit with said secondary and spark gaps, a condenser, a variable inductive resistance, means whereby either said condenser or variable resistance may be placed across said vibrator, a central switch, test terminals connected to said central switch, said central switch having a movable part adapted to place said last mentioned terminals in circuit with said vibrator or directly connect same with said source of current, and a voltammeter also arranged to be connected in circuit through said central switch with said last mentioned test terminals, substantially as described.

In testimony whereof I affix my signature.

RICHARD C. BIERBOWER.